4,569,741

United States Patent [19]

Pohl

[11] Patent Number: 4,569,741

[45] Date of Patent: Feb. 11, 1986

[54] CELLULAR SPIN RESONANCE SPECTROMETER

[76] Inventor: Herbert A. Pohl, 515 Harned Pl., Stillwater, Okla. 74074

[21] Appl. No.: 537,317

[22] Filed: Sep. 28, 1983

[51] Int. Cl.[4] ..................... B01D 57/02; G01N 27/26; G01N 27/28

[52] U.S. Cl. .................................... 204/186; 204/302; 204/299 R; 204/183.1

[58] Field of Search ............... 204/186, 180 R, 299 R, 204/302

[56] References Cited

U.S. PATENT DOCUMENTS 4,326,934 4/1982 Pohl ............................... 204/180 R

OTHER PUBLICATIONS

Kaler, K., et al, "Dynamic Dielectrophoretic Levitation of Living Individual Cells", *J. Biological Physics,* 8 (1980) pp. 18-31.

Pohl, H. A., "Emphasizing Physical Principles in Biological Research", *J. Biological Physics,* 1 (1973) pp. 1-16.

Zimmerman, U., et al, "Electric Field-Induced Cell-to-Cell Fusion", J. Membrane Biol., 67 (1982) pp. 165-182.

Pohl, H. A., et al, "Dielectrophoresis of Cells", Biophysical Journal, vol. 11, pp. 711-727 (1971).

Pohl, H. A., "Natural Oscillating Fields of Cell", Coherent Excitations in Biological Systems, Edited by Frohlich, H., et al, Springer-Verlag, Berlin, pp. 200-210 (1983).

*Primary Examiner*—Andrew H. Metz
*Assistant Examiner*—B. J. Boggs, Jr.
*Attorney, Agent, or Firm*—Flehr, Hohbach, Test, Albritton & Herbert

[57] ABSTRACT

Method and apparatus to characterize and classify neutral particles based on the non-translational motion of said particles in a directionally oriented electric field which as a function of time changes its orientation in space. More particularly, a method and apparatus is disclosed whereby the direction and magnitude of non-translational motion relative to the directionally varying external field can be determined.

18 Claims, 9 Drawing Figures

CELLULAR SPIN RESONANCE SPECTROMETER

BACKGROUND OF THE INVENTION

This invention pertains to a method and apparatus to characterize and classify neutral particles based on the non-translational motion of said particles in a directionally oriented electric field which as a function of time changes its orientation in space. More particularly, a method and apparatus are disclosed whereby the direction and magnitude of the non-translational motion relative to the directionally varying external field may be determined.

U.S. Pat. No. 4,326,934 discloses that non-uniform electric fields induce translational and rotational motions in neutral particles and is incorporated herein by reference. The translational and rotational motions of yeast in an alternating field was observed in 1971. Pohl, H. A. and Crane, J. S., *Biophys. J.* 11,711 (1971). The translational motion toward and subsequent stacking of cells at the two electrodes producing the AC field was the predominant phenomenon observed. While so stacked, it was noted that occasionally individual cells would rotate about an axis perpendicular to the applied field lines. The cells rotated at a rate of several revolutions per second in response to an AC field frequency in the range of $10^2$–$10^6$ Hz. This rotational phenomenon was found to be dependent upon the frequency of the external AC field. As the frequency of the applied field was varied individual cells within the stacks of cells at the electrodes were observed to start and stop their rotational motions over a relatively narrow frequency range. These observations gave rise to the term cellular spin resonance (CSR) to describe this phenomenon.

In addition to the cellular rotation observed in stacks of cells, lone single cells were occasionally observed to demonstrate the same phenomenon. The frequency of such a response for live single cells was, however, distinctly different from that observed for cells stacked at the electrodes. Observation of single cells was, however, hampered by the translational motion of such cells toward the electrodes due to dielectrophoretic forces.

The observed phenomenon has been found to be dependent upon the conductivity of the medium, the intensity of the applied field, with the cell type, with the phase of the cell life cycle, and the presence of trace chemicals which affect cells. In addition, it has been postulated that the rotation of live single cells is, at times, due to the interaction of a natural cellular dipole oscillation and the applied field. *Natural Oscillating Fields of Cells* by Herbert A. Pohl in *Coherent Excitations in Biological Systems* Ed by H. Fröhlich and H. Kremer; Springer Verlag, N.Y. (1983) pgs. 227–238. Other phenomena associated with cells which as yet are unknown may also contribute to non-translational motion. Exposure to complex electric fields may be important in the further characterization of cellular phenomenon.

The characterization of the non-translational motion of neutral particles has heretofore been limited to the measurement of the frequency at which rotation is observed and by a general description that such rotation occurs about an axis perpendicular to the applied electric field. In addition, detailed and continuous observation of single neutral particles has been hampered by dielectrophoretic translational motion. The need therefore existed for an apparatus and method which would allow a more refined study of the observed phenomenon both in arrays of neutral particles and for single neutral particles.

The application of rotating electric fields through the use of multi-electrode systems provides useful information about neutral particles which in the past has been difficult or impossible to obtain. For example, it has been known in the art that living and dead cells as well as certain inanimate particles can be made to spin in an alternating electric field generated by two parallel wires. The use of rotating electric fields as described in the present invention has demonstrated that in a certain frequency range of the applied field under identical environmental conditions live cells spin in a contra-field direction while dead ones spin with the rotating field. Moreover, the direction and magnitude of the non-translational response may be correlated theoretically to the sign and magnitude of the effective dielectric constant of the particle. Since the direction and rate of spin of a neutral particle may be determined over a wide range, dielectric properties of animate and inanimate neutral particles with regular or irregular shape can be determined by use of the present invention.

SUMMARY OF THE INVENTION

In general, the invention consists of means and methods for observing non-translational motion of neutral particles in a directionally orientated electric field which as a function of time changes its orientation in space.

The change in electric field vector orientation can be continuous or pulsed. If continuous, the electric field vector can be made to assume a continuous circular rotation. If pulsed, the electric field vector can be made to sequentially assume discrete pre-defined spatial orientations. The net effect of either the continuous or pulsed change in the electric field orientation is to produce an electric field which rotates in either a clockwise or counter-clockwise direction.

Generally, rotating electric fields are generated by applying pulsed DC or continuous AC electric fields to an array of electrodes. The number and orientation of these electrodes can be varied but typically three or four electrodes are positioned symmetrically with respect to each other. The details of the invention will be disclosed in the description of the preferred embodiment.

The present invention seeks to facilitate and advance the use of the CSR phenomenon. Accordingly, an object of the present invention is to provide methods and means to characterize neutral particles based on the non-translational motion of said particles in a directionally oriented field which varies its orientation with time.

A further object of the present invention is to provide methods and means to determine the direction of the non-translational motion of neutral particles relative to the movement of an applied electric field.

A further object of the present invention is to provide methods and means to characterize the non-translational motion of neutral particles in a circularly rotating electric field.

A further object of the present invention is to provide methods and means for enhancing the observation of the phenomenon described herein by minimizing the translational motion of neutral particles due to dielectrophoretic forces.

A further object of the present invention is to provide methods and means for determining dielectric constants over a wide frequency range for animate and inanimate neutral particles which is relatively unaffected by the regular or irregular shape of the neutral particles.

Additional objects and features of the invention will be evident from the following description of the preferred embodiments taken in conjunction with the accompanying drawings.

DETAILED DESCRIPTION OF THE PREFERRED EMBODIMENT

Figure 1:
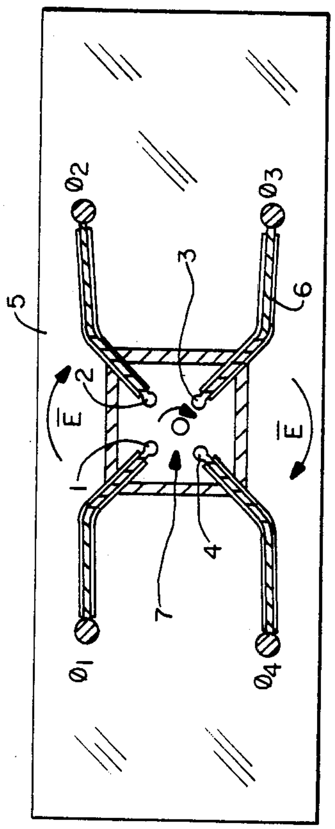
FIG. 1 illustrates a four-electrode embodiment used to generate a circularly rotating electric field.
Figure 2:
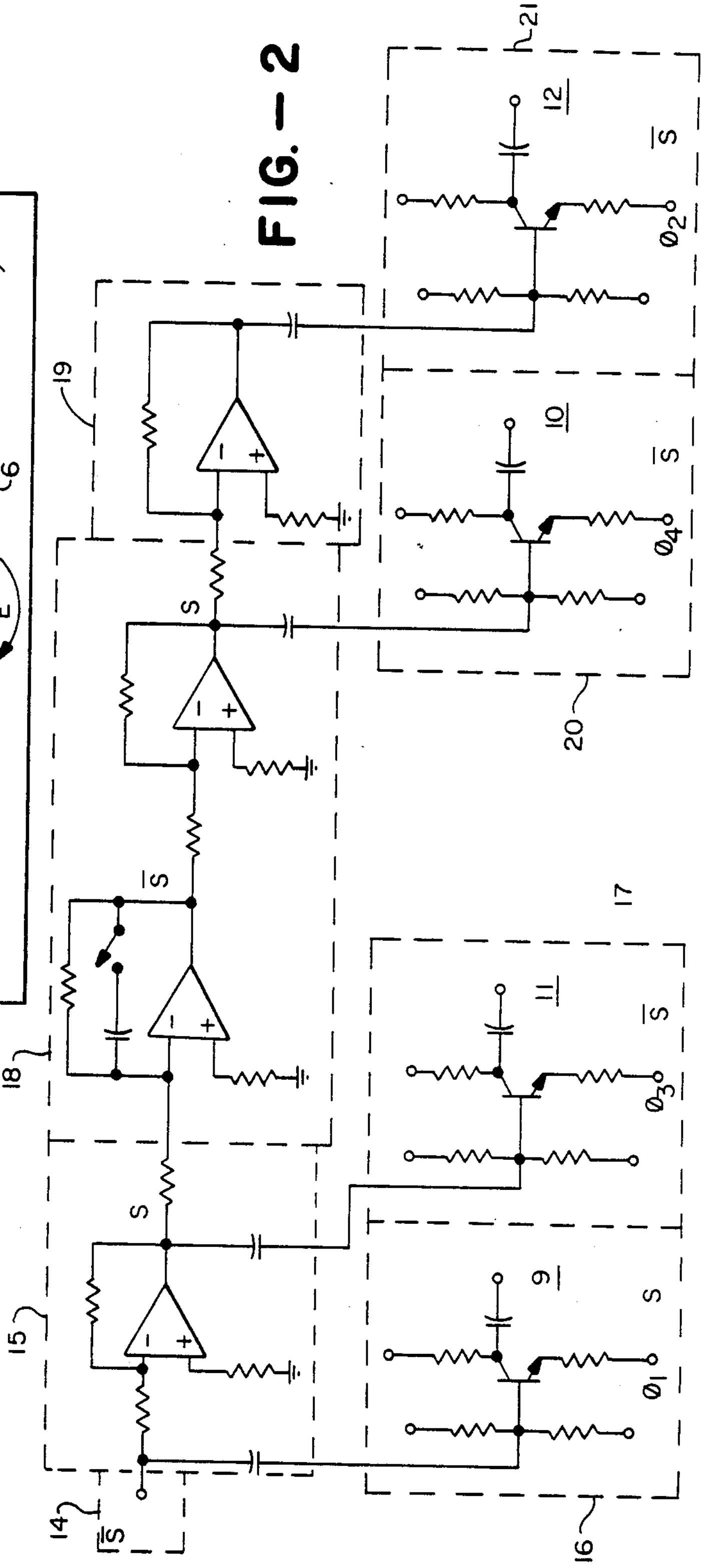
FIG. 2 is a schematic diagram of the circuitry used to generate a circularly rotating electric field.

A preferred embodiment of the present invention is presented in FIG. 1 and FIG. 2. In FIG. 1 four platinum wires of approximately 75 micron-diameter having smoothly rounded tips which are approximately 130 microns in diameter act as electrodes 1, 2, 3 and 4. The platinum wires are approximately one centimeter long and are arranged on a glass microscope slide 5 in the form of a cross with a square centered gap. The distance between opposing electrode tips is approximately 1.2 millimeters. The platinum wires are partially covered by an insulating length of teflon tubing 6 which extends nearly to the tips of the electrodes 1, 2, 3 and 4. Chamber 7 is defined by plastic walls 8 which can be made of polyethylene or any other appropriate material. The walls 8 are approximately one millimeter thick and are positioned to produce a chamber 7 which is approximately 8.2 millimeters in width and height. The walls 8 and electrodes 1, 2, 3 and 4 with teflon tubing 6 are attached to the glass microscope slide 5 by an appropriate cement, for example, epoxy cement. The positioning of the components described and the cementing of said parts provides a chamber which is capable of containing a liquid suspension of neutral particles without substantial leakage. The platinum wires which lead to electrodes 1, 2, 3 and 4 are cemented to leads going to the output terminals 9, 10, 11 and 12 of the rotating field circuit 13 in FIG. 2 by connectors 14 which can be Cu-Pt junctions cemented by silver paste or any other appropriate connectors known to those in the art. The platinum electrodes 1, 2, 3 and 4 are connected to the output 9, 10, 11 and 12 of FIG. 2 in the following manner: 1–9, 2–10, 3–11, and 4–12.

The preferred basic circuitry 13 for generating the circular rotating field is shown schematically in FIG. 2. The input from oscillator 14 is applied to power inverter 15 and inverter 16. Oscillator 14 can be an H-P 200 CD oscillator or any other appropriate source known to those within the art which will provide a signal in the frequency range of interest. The inverter circuits 15 and 16 are exemplary of many possible configurations which can produce the desired results. The output from terminal 9 is inverted with respect to the original signal from oscillator 14. Power inverter 15 maintains signal amplitude and generates an inverted signal which is applied to inverter 17 and the adjustable phase delay circuit 18. Inverter 17 is essentially identical to inverter 16. The output from terminal 11 is inverted with respect to the output from terminal 9.

Phase delay circuit 18 inverts the signal twice so that the output is inverted with respect to the original oscillator signal. The primary purpose of circuit 18 is to provide means for generating a signal which is out of phase with respect to the original input. For the purpose of generating a circularly rotating field this phase angle should be 90°. Circuit 18 also provides means for maintaining the circularity of the applied field by compensating for frequency dependent phase delays and imperfect electrode alignment. Power inverter 19 and inverters 20 and 21 are substantially identical to circuits 15, 16 and 17 and are similarly arranged.

Figure 3A:
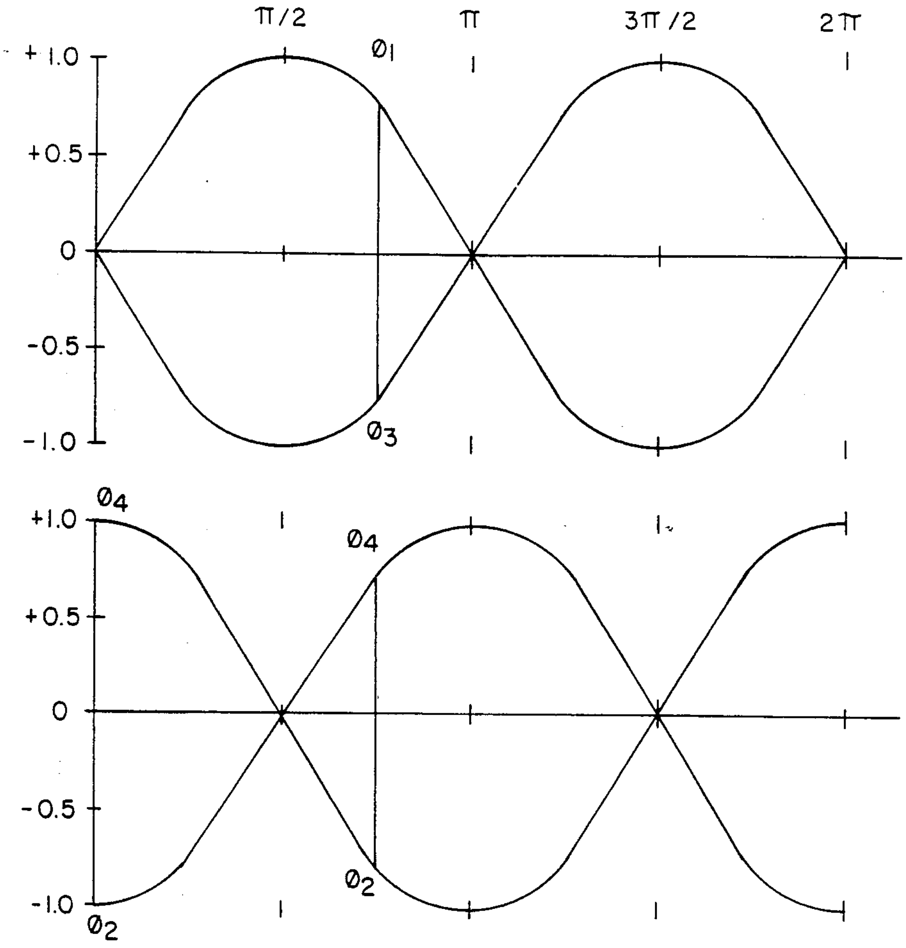
FIG. 3 illustrates the wave forms used to generate a circularly rotating field.

FIG. 3A is a graphic representation of the output signals from terminals 9, 11, 10 and 12 and are designated respectively $\phi_1$, $\phi_3$, $\phi_4$ and $\phi_2$. The subscripts indicate the electrode which receives that particular signal. The sinusoidal output of $\phi_1$ and $\phi_3$, are in phase but inverted with respect to each other. The output of $\phi_4$ and $\phi_2$ are similarly related but are 90° out of phase with respect to $\phi_1$ and $\phi_3$.

Figure 3B:
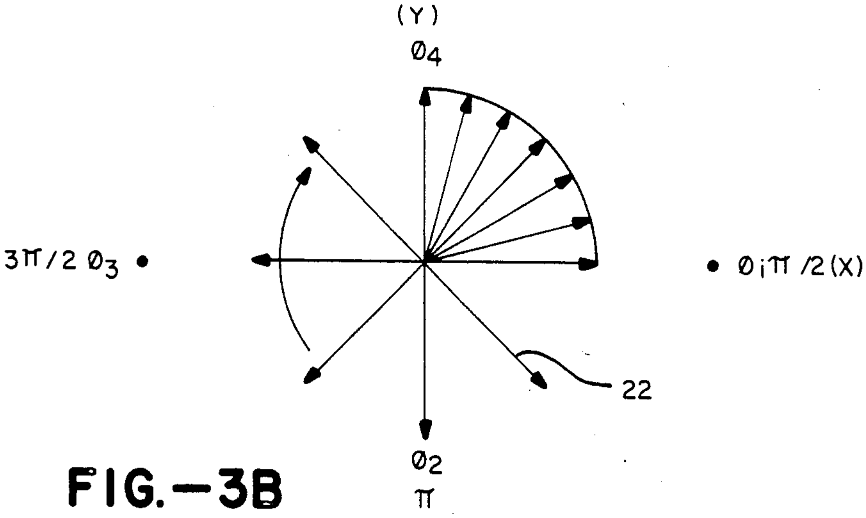

FIG. 3B illustrates the circularly rotating electric field 22 produced by signals $\phi_1$ and $\phi_2$, $\phi_3$ and $\phi_4$ when applied to electrodes 1, 2, 3 and 4. As depicted the direction of rotation is clockwise. The rotation direction can, however, be reversed by shifting the phase relationship between $\phi_1$–$\phi_3$ and $\phi_2$–$\phi_4$ by 180°.

The circularly rotating field depicted in FIG. 3B is one of many types of fields which may be used with the invention. In practicing the invention, those skilled in the art can readily devise means for generating more complex fields to explore the mechanism of the observed phenomenon and to further categorize neutral particles. An example of such a field would be the superposition of a variable frequency oscillation on the rotating electric field. Since the phenomenon of CSR is a recent discovery, the types of fields which may ultimately be used for the present invention cannot be specifically described. The present invention contemplates, however, the use of any fields which induce non-translational motion in neutral particles and should not be restricted to the fields herein described.

Figure 4:
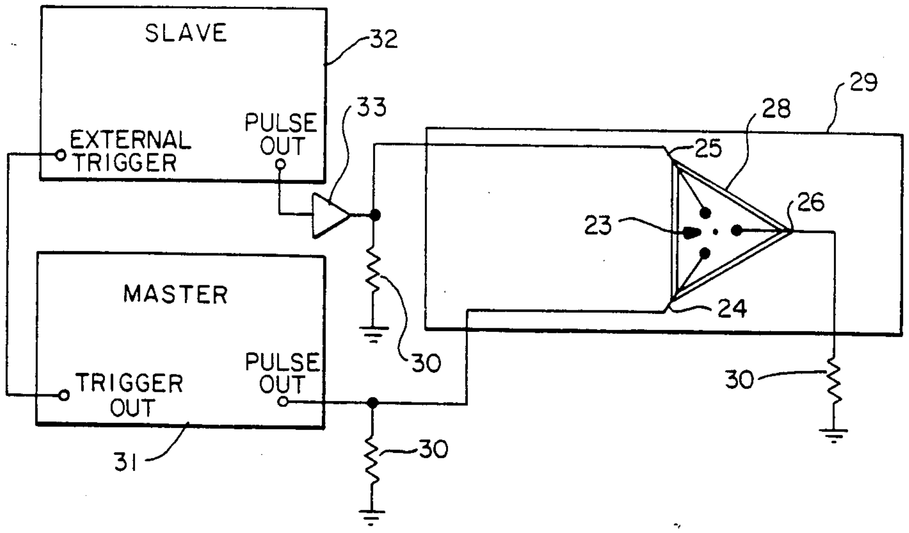
FIG. 4 illustrates a two-pulse three-electrode embodiment for generating pulsed rotating fields.

FIG. 4 illustrates a second embodiment of the invention. The materials used in constructing the triangular chamber 23 are substantially the same as those used in the four electrode apparatus depicted in FIG. 1. Three teflon-coated platinum electrodes 24, 25 and 26 are mounted together with plastic walls 28 on glass microscope slide 29 to form a triangularly centered gap. Each electrode is grounded through an appropriate resistor 30. Master unit 31 is a pulse source which can generate DC pulses over a frequency range of interest. The output for master unit 31 is applied to electrode 24. Slave unit 32 is a DC pulse generator which is activated by the trigger output of master unit 31. Slave unit 32 contains circuitry which allows the DC output of generator 32 to be delayed. The output from generator 32 is applied to electrode 25. If necessary, the amplitude of the signal can be regulated by amplifier 33. Master unit 31 may be a H-P pulse generator model 214A with a frequency range of 10 KHz to 100 KHz or other appropriate pulse source while slave unit 32 can be a Rutherford Electronics Company, B16 pulse generator.

Figure 5:
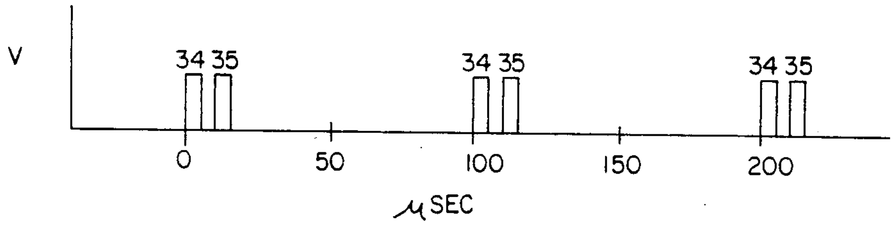
FIG. 5 illustrates a pulsed DC wave form and the electric field generated in a two-pulse three-electrode embodiment.
Figure 5:
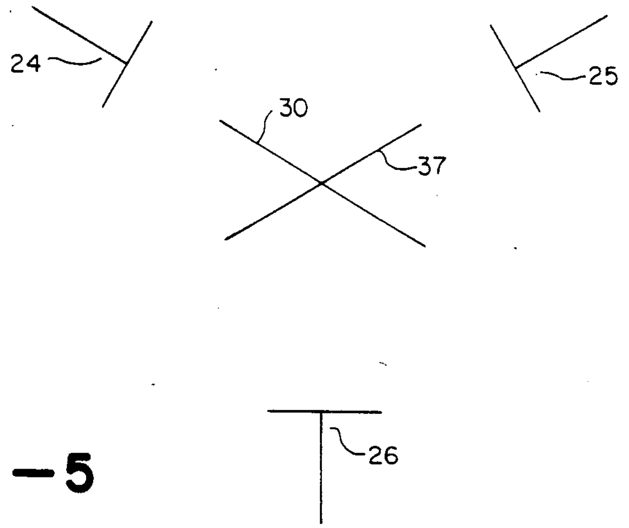

FIG. 5A illustrates the DC pulses generated as a function of time when a 5 micro second 10 KHz signal is generated by master unit 31 and the time delay in slave unit 31 is 10 micro seconds. As illustrated, pulse 34 is applied to electrode 24 and pulse 35 is applied to electrode 25. As illustrated in FIG. 5B, pulses 34 and 35 produce electric fields 36 and 37 respectively. The affect of the sequential application of the DC pulses to the different electrodes is the production of a rotating electric field with discreet pre-defined spatial orientations.

Figure 6:
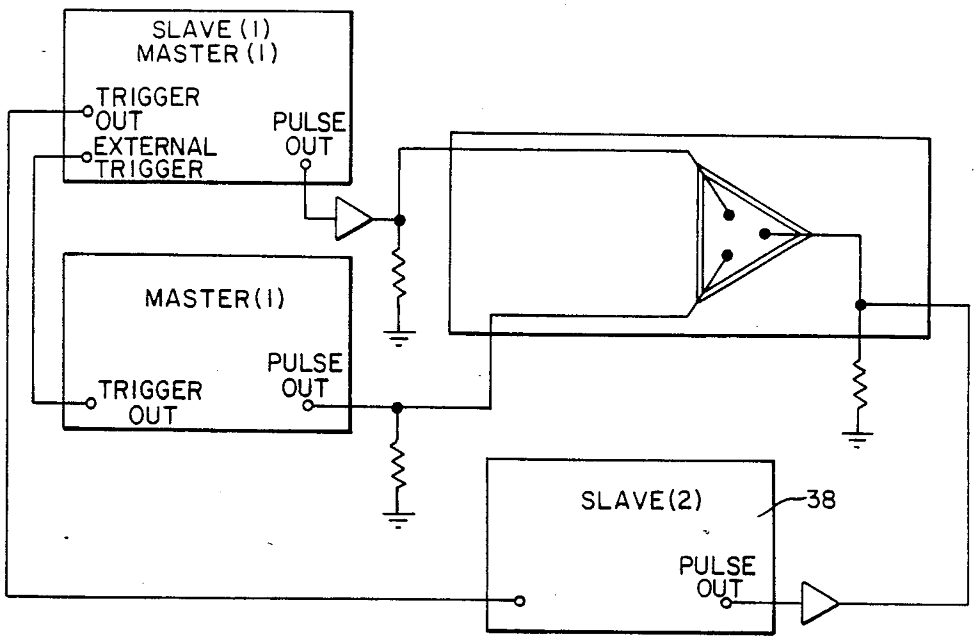
FIG. 6 illustrates a three-pulse symmetrical three-electrode embodiment.
Figure 7:
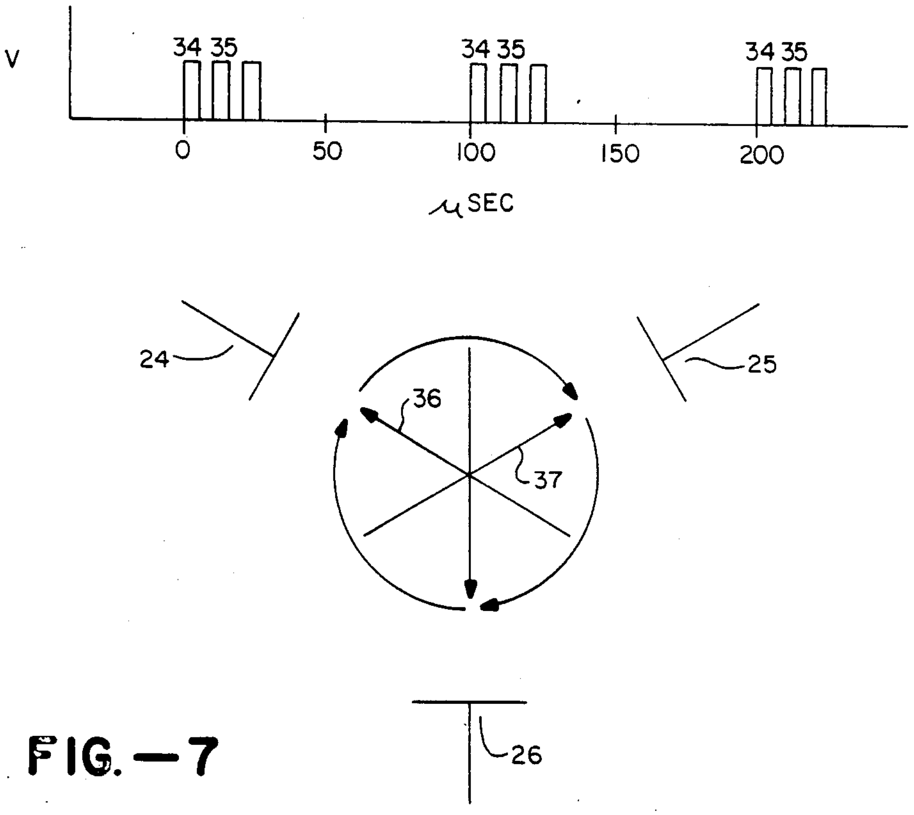
FIG. 7 illustrates the pulsed DC wave form and resulting electric fields in a three-pulse symmetrical three-electrode embodiment.

FIG. 6 shows the same basic apparatus as that of FIG. 4 except for the addition of a second slave unit 38. Slave unit 38 is a pulse DC generator driven by slave unit 32. The output from unit 38 is applied to electrode 26. FIG. 7 illustrates that the DC pulse pattern and electric field vectors produced in this embodiment.

As discussed in conjunction with the four electrode apparatus of FIG. 1, it is contemplated that a variety of electric fields will be applied to these three electrode embodiments.

It is also contemplated that the invention is not limited to the three electrode and four electrode embodiments described. Any two or three dimensional combination of electrodes which can be used to generate electric fields that induce non-translational motion in neutral particles is contemplated by the invention.

EXAMPLE 1

Yeast cells (*Saccharomyces cerevisiae*) were grown at 25° C. in sterile Saboraud Liquid Medium (Difco) for seven days. The cells were harvested by centrifugation and repeatedly washed with de-ionized water until the overall resistivity of the suspension was at least 200 Kohm-cm. A drop of cell suspension was placed in the chamber well of the four electrode apparatus and covered with a microscope cover slip. The cells were observed through a microscope with 400X magnification. The suspension was exposed to a circularly rotating electric field (10 volts p-p) at frequencies ranging from 500 to 75,000 Hz. The rate of rotation for individual cells was measured at different frequencies. The procedure was repeated on a suspension of dead cells which were heat-killed by exposure to 70° C. for three minutes.

Figure 8:
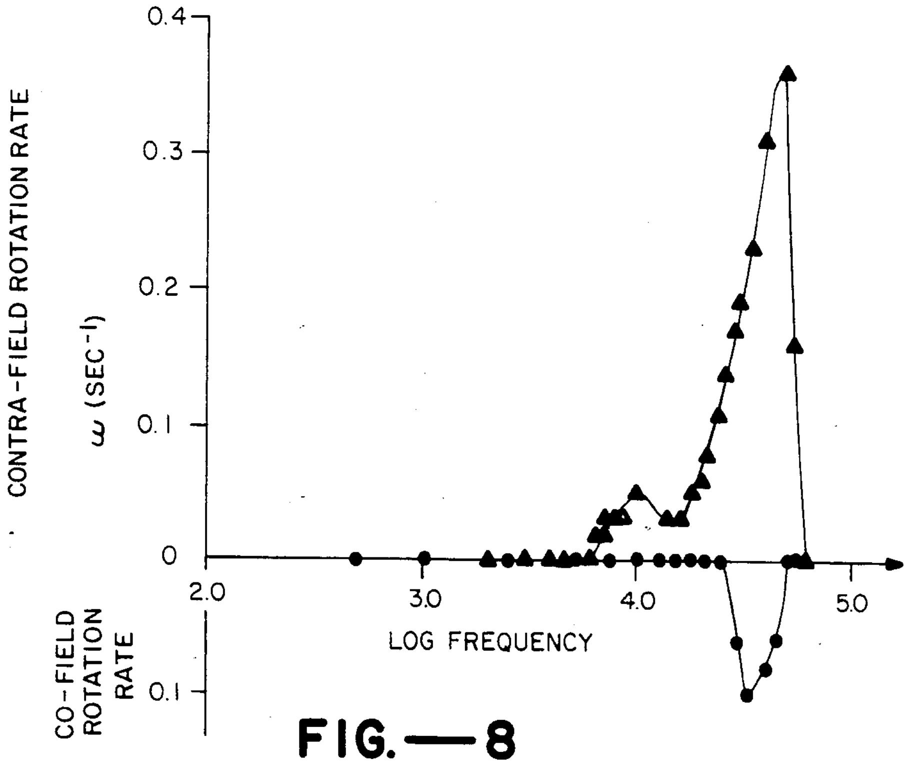
FIG. 8 is the CSR spectrum for individual yeast cells exposed to a circularly rotating electric field.

FIG. 8 is the CSR spectrum derived from this experiment. As can be seen the live cells rotate in a contrafield direction and exhibit two response regions. Dead cells, on the other hand, have only one response region and rotate in the same direction as the applied field.

EXAMPLE 2

Barium titanate powder was ground in a mortar and pestle. The powder was subsequently graded by size to provide particles of 1.5-3.0 micron diameter. This was achieved by sedimentation followed by successive filtration through Nucleopore filters of 3 and then 2 micron pore diameter. The particles were suspended in 0.01% soluble potato starch to stabilize the suspension. The resistivity of the suspension was 86 Kohm-cm when analyzed in the four electrode apparatus.

Figure 9:
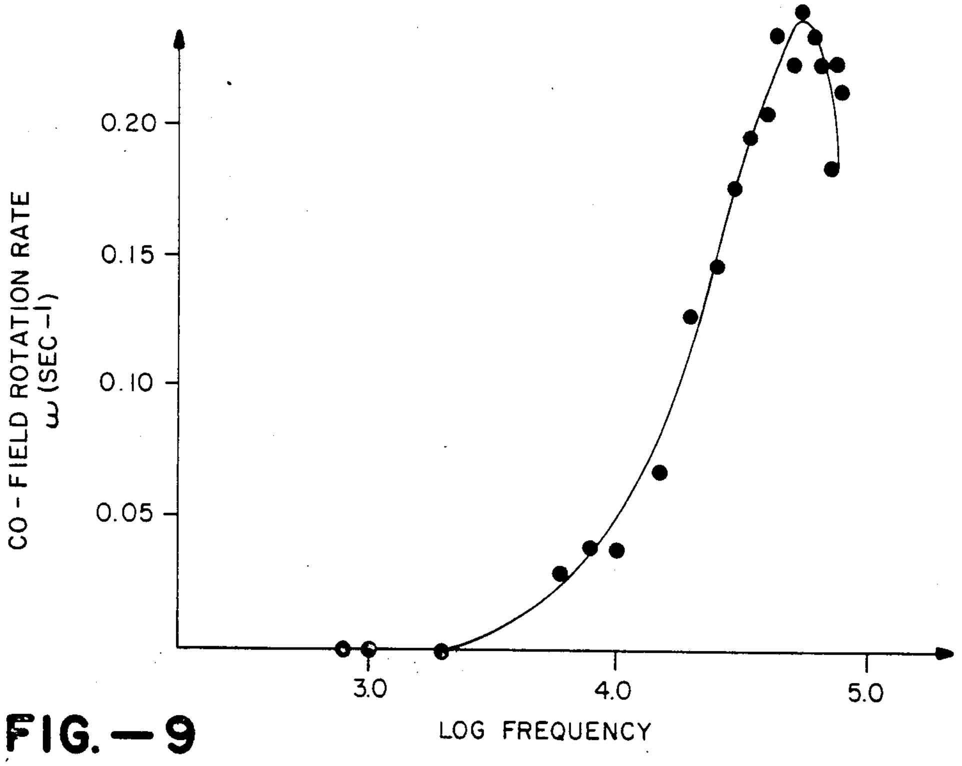
FIG. 9 is the CSR spectrum for barium titanate.

The results of that experiment are shown in FIG. 9. As can be seen, highly polarizable inanimate particles such as barium titanate rotate in the same direction as the rotating electric field. This is consistent with the theory proposed by Pohl. cf. Pohl, H. A. Cellular Spin Resonance in Rotating Electric Fields, *Int. J. Quantum Chem.* (1983) in press.

Having described the preferred embodiment of the present invention, it will occur to those skilled in the art that various modifications and alterations can be made to the disclosed embodiments without departing from the spirit of the invention.

The following claims define the scope of the invention:

What is claimed is:

1. A method for characterizing neutral particles based on the induced non-translational motion of said particles by an electric field comprising, generating a directionally orientated electric field wherein the orientation of said field in space has more than two directly opposite orientations and said orientation varies as a function of time, exposing one or more neutral particles to said field, and determining the direction of the induced non-translational motion of said particle relative to said field.

2. A method according to claim 1 wherein said non-translational motion is rotation.

3. A method according to claim 1 where said non-translational motion is libration.

4. A method according to claim 1 where said electric field is circularly rotating.

5. A method according to claim 4 where said circularly rotating field is generated by the application of four sinusoidal fields to four symmetrically arranged electrodes said fields being related such that the fields applied to opposing electrodes are 180° out of phase with respect to each other and such that the fields applied to adjacent electrodes are 90° out of phase with respect to each other.

6. A method according to claim 1 where said electric field is sequentially pulsed to generate directionally discrete electric fields.

7. A method according to claim 1 where said electric field has a rotational component and an oscillating component.

8. A method according to claim 1 where said neutral particles are derived from biological systems.

9. A method according to claim 1 where said neutral particles are inanimate.

10. An apparatus for characterizing neutral particles comprising, means for generating a directionally oriented electric field wherein said field has more than two directly opposite orientations which vary with time and means for detecting the direction of induced non-translational motion of said neutral particles relative to said field.

11. An apparatus according to claim 10 where said non-translational motion is rotation.

12. An apparatus according to claim 10 where said non-translational motion is libration.

13. An apparatus according to claim 10 where said electric field is circularly rotating.

14. An apparatus according to claim 13 where said circularly rotating field is generated by the application of four sinusoidal fields to four symmetrically arranged electrodes said fields being related such that the fields applied to opposing electrodes are 180° out of phase with respect to each other and such that the fields applied to adjacent electrodes are 90° out of phase with respect to each other.

15. An apparatus according to claim 10 where said electric field is sequentially pulsed to generate directional discrete electric fields.

16. An apparatus according to claim 10 where said electric field has a rotational component and an oscillating component.

17. An apparatus according to claim 10 where said neutral particles are derived from biological systems.

18. An apparatus according to claim 10 where said neutral particles are inanimate.

* * * * *